Oct. 13, 1970  A. EDELSTEIN  3,533,680

OPTICAL CONSTRUCTOR SYSTEM

Filed Dec. 17, 1965  3 Sheets-Sheet 1

INVENTOR.
ARTHUR EDELSTEIN

BY *James and Franklin*

ATTORNEYS

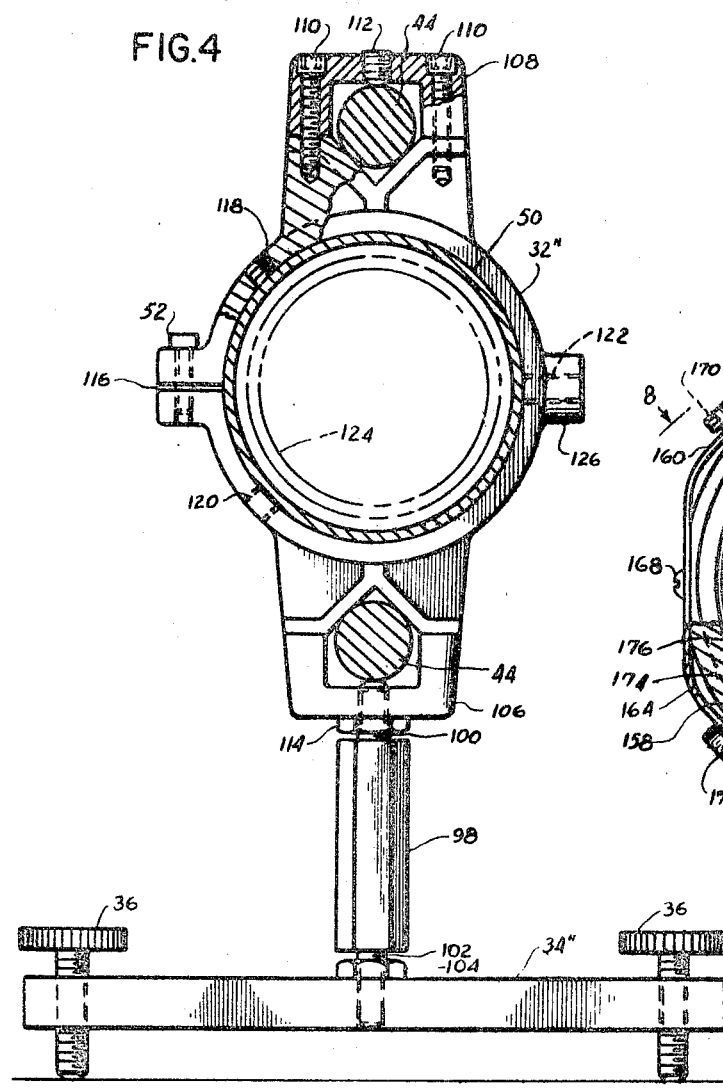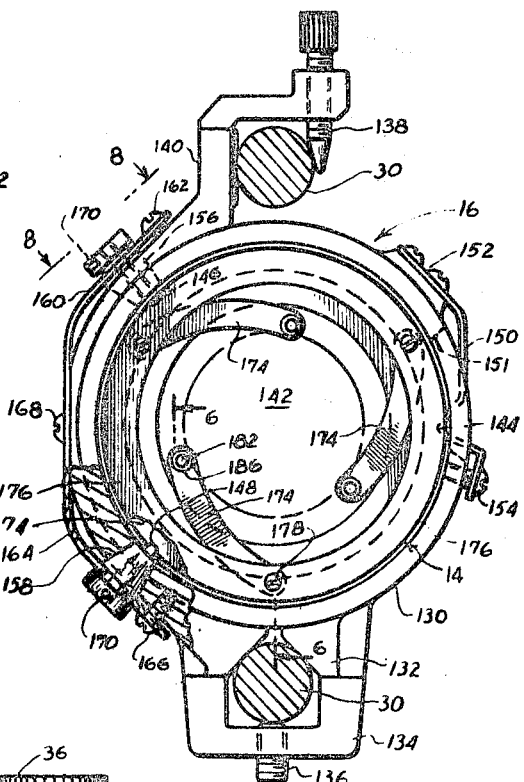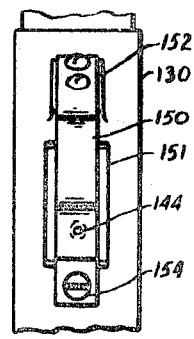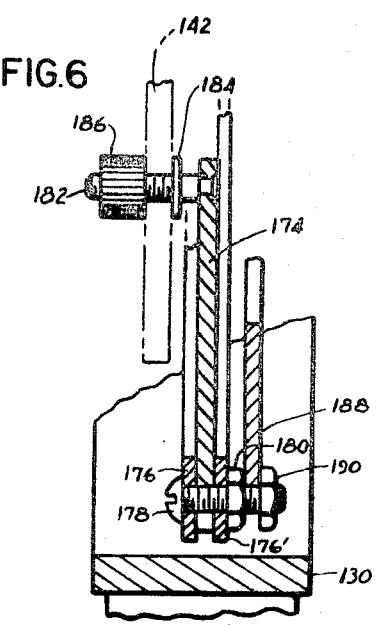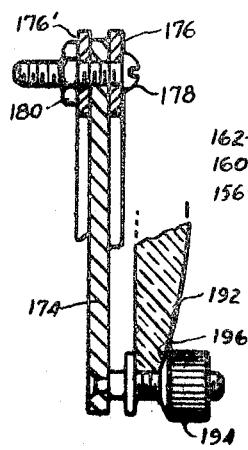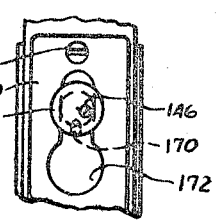

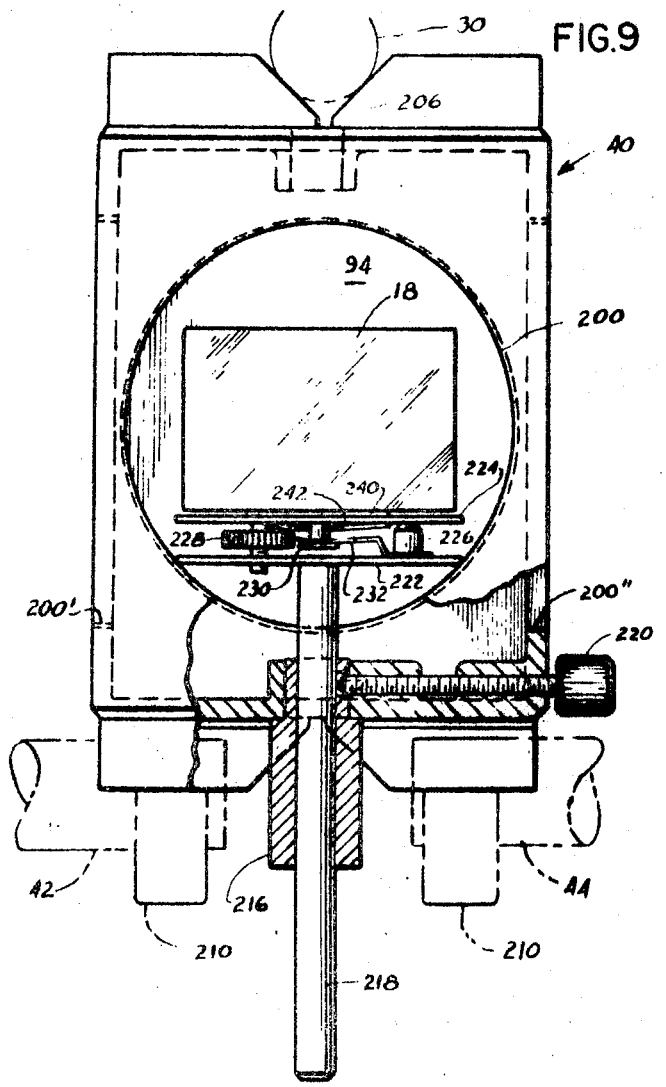
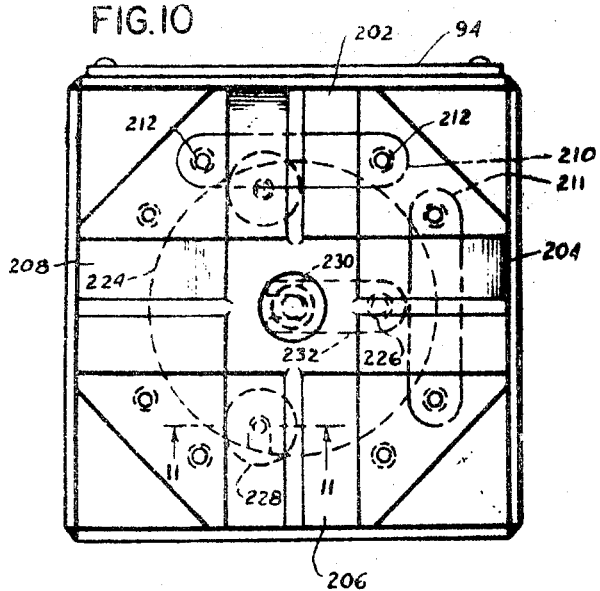
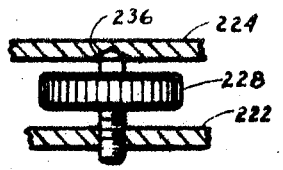
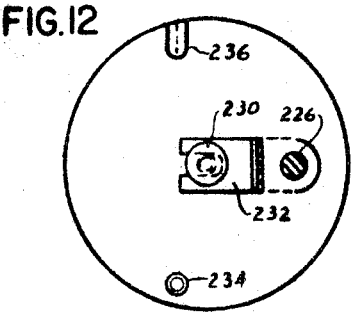
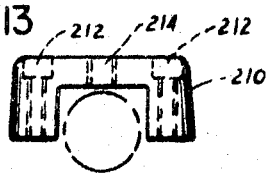
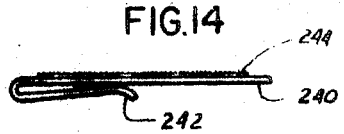
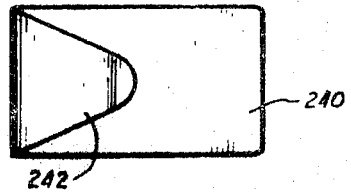
INVENTOR.
ARTHUR EDELSTEIN United States Patent Office 3,533,680
Patented Oct. 13, 1970

3,533,680
OPTICAL CONSTRUCTOR SYSTEM
Arthur Edelstein, 173—43 Croydon Road,
Jamaica, N.Y. 11432
Filed Dec. 17, 1965, Ser. No. 514,466
Int. Cl. G02b 7/02
U.S. Cl. 350—251                 14 Claims This invention relates to optical systems for use in testing, teaching, and experimental work.

The usual system or optical bench uses components supported by holders having individual bases which are movable on a bench.

The general object of the present invention is to provide an improved optical constructor system for the same purpose. A more specific object is to provide a carriage for an optical element, the said carriage being adjustable along a pair of spaced rails. The carriage has seats receiving the rails, and one seat preferably is releasable so that the carriage may be swung outward around the other rail for easy access.

In accordance with the present invention the carriage has radial screws adjustably receiving a holder, and the screws may be eccentrically received in rotatable plugs in order to afford a wobble or tip-tilt adjustment of the holder relative to the carriage.

In accordance with a further feature and object of the invention, the holder comprises rings with three support arms having their outer ends adjustably clamped between the rings, and having means such as studs and thumb screws at their inner ends to receive an optical element such as a lens or reticle. The generally tangential arrangement of the three arms permits reception of optical elements of widely differing diameter.

Other objects of the invention center about the support of the rails. For this I provide a support ring carried on a post projecting from a base having levelling screws. The support ring may be received on the post in either of two positions which are at right angles, so that the rails may be spaced apart in either superposed (stacked) relation, or in side by side relation. In addition the support ring is split and provided with a clamp screw, thereby adapting it to receive a tube when the optical system which is being set up requires a tube, or is to be an enclosed system. In such case the tubes preferably have a male thread at one end and a female thread at the other end as described in my pending application Ser. No. 360,500, filed April 17, 1964 and entitled "Optical Systen Using Modules," now abandoned.

In accordance with a further feature and object of the invention, the support ring may be mounted on previously supported rails in order to hold a tube between the rails. or the ring may be supported by a tube in order to hold the rails, the latter being particularly useful when it is desired to change from rails which are side by side, to rails which are stacked, or vice versa.

A further object of the invention concerns beam splitting or folding with optical paths in perpendicular relation, and is to provide a right angle fixture, this being designed to receive the support rails previously mentioned and or the threaded tubes previously mentioned. The said fixture has an upright stem for carrying an optical element, usually a prism or a pellicle, the said stem being arranged for height adjustment. In accordance with a more detailed feature the stem carries a table, which carries a plurality of thumb screws which in turn support a platform on which the prism is carried, thereby affording wobble or tip-tilt adjustment of the prism.

To accomplish the foregoing objects, and others which will hereinafter appear, my invention resides in the optical constructor system and the components thereof and their relation one to another, as are hereinafter more particularly described in the following specification. The specification is accompanied by drawings in which:

FIG. 4 is a partially sectioned elevation looking in the direction of the arrows 4—4 of FIG. 1, and shows one of the support rings for the system;

FIG. 5 is a partially sectioned elevation of a carriage for an optical element, looking in the direction of the arrows 5—5 of FIG. 1;

FIG. 5A is a fragmentary view looking toward the right side of FIG. 5;

FIG. 6 is a fragmentary section taken on the line 6—6 of FIG. 5, and drawn to larger scale;

FIG. 7 shows similar parts, inverted, and slightly modified to hold a convex lens;

FIG. 8 is a fragmentary view looking in the direction of the arrows 8—8 of FIG. 5;

FIG. 9 is a partially sectioned elevation of a right angle fixture, looking in the direction of the arrows 9—9 of FIG. 1;

FIG. 10 is a plan view of the same, without the rails and the caps or clamps holding the rails;

FIG. 11 is a fragmentary section taken on the line 11—11 of FIG. 10;

FIG. 12 is an inverted plan view of the platform;

FIG. 13 is an elevation of one of the caps or clamps used with the V grooves of a support ring or a carriage or a right angle fixture;

FIGS. 14 and 15 are edge and bottom views of a mounting spring used to hold a prism.

Figure 1:
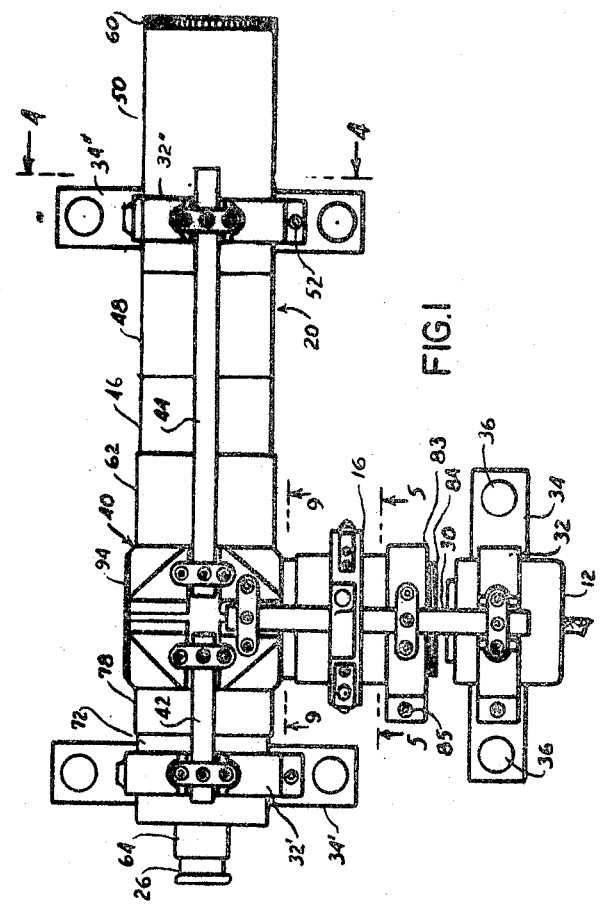
FIG. 1 is a plan view of an autocollimator assembly using components of my optical constructor system.
Figure 2:
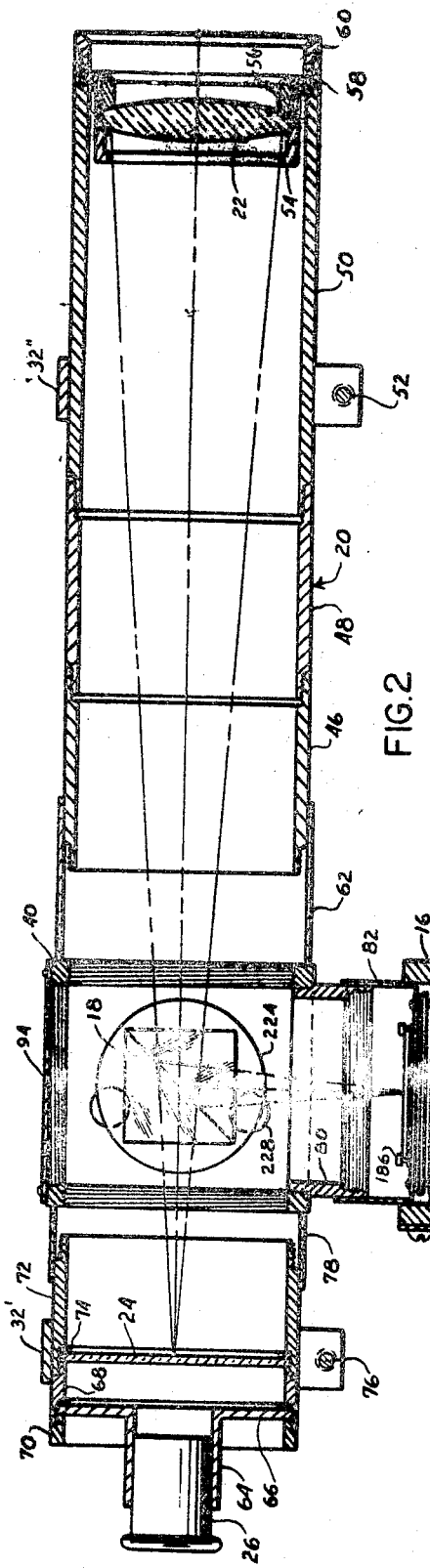
FIG. 2 is a horizontal section through the assembly of FIG. 1, drawn to larger scale.

The optical constructor system comprises components which are interchangeably and appropriately assembled to set up a desired optical system. FIGS. 1 and 2 show components assembled to provide an autocollimator system for checking the right angle relationship of mirrors being tested. Considered optically, the system comprises a lamp housing or illuminator 12 which projects light through a reticle carried by a holder 14 which in turn is carried by a carriage 16. The image is received by a reflecting prism 18 which reflects the same through a tube or barrel 20 carrying an objective lens 22. The mirror to be tested is located beyond the end of barrel 20 and reflects the image back to and through the prism 18 to a reticle 24 and an eye piece 26 which may be like that of a microscope or telescope. If the mirror being tested is properly aligned, the reticle images are superposed.

In first setting up the autocollimator a mirror which is known to be aligned is employed, and the reticle in holder 14 is adjusted by means later explained, and the prism 18 also is adjusted by means later explained, until the reticle images are brought into correct superposition at 24. After this initial calibration or adjustment of the autocollimator, it may be used for the testing of other mirrors.

Referring to FIG. 1, the carriage 16 is carried by and is adjustable along a pair of spaced rails 30. Because the system includes a right angle in a horizontal plane, the rails are preferably superposed or stacked, but the same components may be used in other systems with the rails spaced apart horizontally, that is, at the sides of the tubes and carriage instead of at the top and bottom. The rails 30 are carried by a support ring 32 which is carried by a base 34, preferably having levelling screws 36.

The right angle fixture 40 is carried by the rails 30 and additional pairs of rails 42 and 44. The rails 42 are carried by another support ring 32' and base 34', and the rails 44 are carried by a third support ring 32" and base 34", like the support ring and base 32, 34, previously mentioned.

The optical system may be open, or closed, or partially closed. Referring to FIG. 2, the barrel 20 is built up of tubes 46, 48 and 50 screwed together for desired total length, with each tube having a male thread at one end and a female thread at the other. Tube 50 is clamped in support ring 32" by means of a clamp screw 52. Lens 22 is held in a holder 54 by means of a threaded ring 56. The flange 58 of the lens holder 54 is secured in position by means of a tube nut 60.

At the other end of barrel 20 there is a tubular light shield 62 which is axially slidable on tube 46. It is slid up to the right angle fixture 40.

The eye piece 26 is slidable in an adapter or holder 64, the flange 66 of which is clamped in a short tube 68 by means of a tube nut 70. Another tube 72 is threadedly connected to tube 68, with the reticle 24 held therebetween, as by means of a yieldable gasket 74. The tube assembly 68, 72 is gripped in the support ring 32' by means of a clamp screw 76. Here again a slidable light shield 78 may be provided to close the gap between the tube 72 and the right angle fixture 40.

The right angle fixture 40 has threaded openings and could receive threaded tubes instead of slidable light shields. This is shown on the third face, in which the fixture 40 threadedly receives a tube 80. This has a slidable light shield 82 which is moved up to element holder 14.

On the opposite side there is a tube 84 carrying a diffuser 86 which may be opal glass. This is held in position by means of a tube nut 88 and a yieldable gasket 90. A light shield 92 may be provided on tube 84, and is moved close to the element holder 14.

Figure 3:
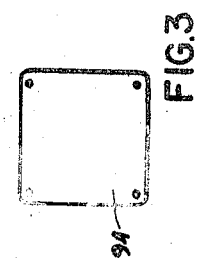
FIG. 3 shows a coverplate for covering an unused opening of the right angle fixture, drawn to reduced scale.

The right angle fixture 40 is open on four faces, but the fourth or unused face is closed by means of a cover plate 94. This plate is shown in FIG. 3, it being a simple square sheet metal plate with four holes at the corners to receive four small screws which hold the plate on the fixture, as shown at 94 in FIG. 2.

The support ring and base construction may be described with reference to FIG. 4. The support ring 32" supports the upper and lower rails 44. These are round rods, preferably made of stainless steel. The ring is carried by a post 98 on a base 34", the latter having levelling screws 36 threadedly received therein. The post 98 is preferably hexagonal, with reduced diameter threaded ends 100 and 102. The lower threaded end 102 is threadedly received in base 34" and has a lock nut 104. The upper threaded end is received in the support ring, and more specifically in a cap or clamp 106 which is secured to a V-shaped seat 108 by means of screws 110, as is better shown in the similar upper clamp 108. The screws shown are Allen head screws. The upper rail 44 is secured by a set screw 112, preferably made of nylon. The lower rail 44 may be locked by the upper end of the threaded part 100 acting as a set screw, and for this purpose the part 100 is preferably nylon tipped, that is, it has a nylon insert which projects slightly. A lock nut 114 may be added and tightened against the cap 106.

The support ring is preferably split at one side, as is indicated at 116 and the ends may be drawn together by means of a clamp screw 52. Thus the support ring may clamp the tube 50. The tube is of matching diameter, in this case three inches in outside diameter. However, provision is made to also receive a tube of smaller diameter, and for this purpose ring 32" (and the other rings) has three threaded radial holes indicated at 118, 120 and 122. By inserting screws in these holes a tube of smaller diameter may be received as is indicated in broken lines at 124.

The ring 32" is preferably reinforced at the hole 122 by means of a boss 126, this boss preferably being at right angles to the post 98. The thread size at 122 matches the thread 100 of post 98 and, therefore, by screwing the upper end of a post into the boss 126 the support ring 32" may be used to hold two spaced rails in side by side relation, instead of the superposed relation here shown.

Reverting to FIG. 1, it will be seen that the entire system is carried by three support rings 32, 32', and 32", on three posts (not visible in FIG. 1), and on three bases 34, 34', and 34" each with levelling screws. The support ring 32 carries upper and lower rails 30. The support ring 32' carries upper and lower rails 42 and tube 72. The support ring 32" carries upper and lower rails 44 and tube 50. Ring 32 also carries lamp housing 12.

The support rings (like ring 50 shown in FIG. 4) are usable without the post and base there shown. In FIG. 1 the rails 30 carry a support ring 83 which in turn carries the tube section 84. There is no need for another post and base at this point because the rails 30 are already supported by the support ring 32 with its post and base. The support ring 83 clamps the tube 84 by means of its clamp screw 85.

Referring now to FIG. 5 the carriage 16 comprises a ring 130 having an enclosed seat at one side, in this case at the bottom around the lower rail 30, and having an openable seat on the opposite side, in this case at the top to receive the upper rail 30. When the upper seat is released the carriage may be swung about the lower rail for easy access to the holder 14 in the carriage.

The ring 30 is cast integrally with a V-shaped seat 132 which is completed by a cap or clamp 134 held by spaced screws (as shown at the top of FIG. 4) and provided with a nylon set screw 136. On the opposite side the seat is open and has a tapered lock screw 138 which is spaced from the side 140 of the open seat, so that the screw when tightened acts as the opposite side of the seat, with the upper rail 30 gripped therebetween.

The optical element, in this case a reticle 142, is carried in holder 14, and the latter is detachably received in carriage 16. For this purpose, the ring 130 has a spring pressed projection at 144, and two ball-tipped radially disposed screws 146 and 148 at spaced points to provide a three point mounting for the annular holder 14. Because the holder is built up of two spaced rings, as described later, it has a peripheral channel which receives the three ball tips. To insert the holder 14 in the carriage 16 the holder is first pressed against the yieldable projection 144, and then is permitted to spring back against the tips 146 and 148. The holder may be centered by appropriately rotating either or both of the screws 146 and 148. These are preferably at right angles to one another.

The rounded projection 144 is formed on a leaf spring 150 secured to the ring at 152. Its motion may be stiffened or limited if desired by means of an adjustable screw 154 at the remote end of the spring. The carriage ring 130 is cut away for much of the length of spring 150 to form a window 151 to receive the inwardly bent part of the spring.

The radial screws 146 and 148 are not received directly into the carriage ring 130, and in preferred form they are eccentrically received in rotatable plugs 156 and 158 respectively. By rotating the plugs the holder 14 and its element 142 may be given a wobble or tip-tilt adjustment.

In the constructor here shown the plugs are tapered inwardly and are received in mating tapered holes in the carriage ring 130. A clamp spring 160 bears against plug 156 and may be tightened by means of a clamp screw 162. Similarly, a clamp spring 164 bearing against plug 158 may be tightened by means of a clamp screw 166. The springs 160 and 164 may be the opposite ends of a single spring, secured to carriage ring 130 by means of a screw 168.

For convenience, the plugs may be inwardly stepped or shouldered, and the clamp springs may bear against the shoulders, thus leaving the outer ends of the plugs exposed for rotation when released. This rotation is facilitated by using a small spanner rod temporarily inserted in a spanner hole 170. The outer ends of the radial screws 146 and 148 are accessible through the top of the plug. The screws 146 and 148 preferably have transverse nylon inserts to make the same self-locking so as to maintain their adjustment.

FIG. 8 shows how the clamp spring 160 may have a keyhole shaped opening 172. The enlarged end slips over the plug during assembly, whereas the smaller end is received over and later bears against the stepped or shouldered part of the plug. This view also shows the eccentric relation of the screw 146 to the plug 156 and shows the radial disposition of the spanner hole 170. A number of such spanner holes may be provided if desired.

Referring to FIG. 5, the holder 14 comprises three relatively long support arms 174 and two rings 176, with the outer ends of the support arms 174 secured between the two rings, while the inner ends of the support arms have means to hold the optical element 142. In this way, the holder can receive elements which vary greatly in diameter.

Referring to FIG. 6, the rings 176 and 176' receive the outer end of the arm 174 therebetween. The arm is locked in position by tightening a screw 178 received in a nut 180. At its inner end, the arm 174 has a threaded stud 182 riveted thereto. This is flanged or has a collar at 184, and receives a thumb nut 186 which is hand tightened against the peripheral edge of the optical element, in this case the reticle 142.

If it be desired to mask some of the opening, this may be done by means of an aperture disc 188 which is held in position by an additional nut 190 received on the screw 178.

If the optical element is convex instead of flat, a different nut may be used on screw 182 (FIG. 6), which nut is appropriately shaped. Thus, referring to FIG. 7 which is drawn as though looking at the right hand arm 174 in FIG. 5, the inner lower end of the arm receives a convex lens 192, and the thumb nut 194 is appropriately tapered at 196. The outer upper end of arm 174 is clamped between rings 176 and 176' as before by means of screw 178 and nut 180.

If desired the holder may be provided with longer screws at 182, thus adapting the same to a doublet, that is, to hold two lenses close to one another in a single holder.

The right angle fixture is illustrated in FIGS. 9, 10 and 13. Referring to those figures, the fixture is a hollow generally square box with four large threaded openings in quadrature to receive threaded tubes. FIG. 9 shows one such opening at 200, with additional openings at 200' and 200". (All four threaded openings are shown in the horizontal section of FIG. 2.) Any one or more of these openings, when not needed, may be covered by a cover plate shown at 94 in FIG. 10, and also shown in FIGS. 2 and 3.

The top of the box is closed except for a center hole, and has four V grooves arranged in quadrature as shown at 202, 204, 206 and 208 in FIG. 10. These may be capped by appropriate caps or clamps suggested at 210 at the bottom of FIG. 9, and one of which is separately shown in FIG. 13. It may be the same as the clamps previously described in connection with FIGS. 4 and 5, and is preferably secured by two spaced screws received in holes indicated at 212 in FIG. 13. The cap has a third hole 214 to receive a set screw, and the latter is preferably made of nylon or is nylon tipped. FIG. 10 shows the holes 212 for one such cap 210, and it will be seen that there are three more pairs of holes for three additional caps, one for each of the V grooves. The location of another clamp is suggested at 211.

The caps are so dimensioned that they clear one another, and FIG. 1 shows three caps in simultaneous use at the top of the fixture 40. Three similar caps are used at the bottom for the bottom rails, it being understood that the bottom for the box, like the top, has four V grooves and caps in quadrature to receive bottom rails. Two bottom rails are indicated in broken lines in FIG. 9 at 42 and 44. The corresponding top rails are omitted in FIG. 9, but a transverse top rail 30 is shown in broken lines.

The right angle fixture is used for beam splitting and to fold the optical path. It permits right angle turns of the framework. The rails are disposed one above the other when there is to be a horizontal turn as here illustrated. The rails are disposed side by side if there is to be a vertical turn. A change from one arrangement of the rails to the other may be provided by using two support rings mounted on a single tube and rotated 90° one with respect to the other, so that one carries the rails side by side, and the other carries the rails stacked or one above the other.

There is one important difference between the top and bottom of the housing 40, and that is that the bottom has an upright bushing 216 which receives an upright stem 218 for carrying the optical element 18. Bushing 216 is force fitted or otherwise fixedly secured in the bottom of the housing. The stem 218 is vertically adjustable, and its adjustment is locked by means of a relatively long set screw 220, preferably with a knurled head as shown. The inner end of the set screw preferably is provided with a nylon insert in order not to mar the stem 218.

Stem 218 has a circular table 222 secured thereto, as by means of a shoulder and rivet. This in turn carries a circular platform 224 with a three point support. At one point there is a fixed stud 226. At the two other points there are thumb screws 228, the lower ends of which are threadedly received in table 222 as is best shown in FIG. 11, and the upper ends of which are rounded and bear against the platform 224. The platform is preferably held downward by means of a depending stud 230 (FIG. 9) which receives the forked end of a leaf spring 232, the outer or fixed end of which may be secured to the table 222 when riveting the stud 226 in position.

An inverted view of the platform is given in FIG. 12, and shows the bifurcated end of leaf spring 232 received over the head of center stud 230. It also shows the conical seat 234 for the rounded upper end of one of the two thumb screws 228 (FIGS. 9 and 11). A seat 236 having a V section is provided for the other thumb screw, and in this case the seat is elongated, to allow for possible variation or tolerance in the spacing between two conical seats if two such seats were employed.

The prism 18 may be held on the platform in different ways. As here illustrated I provide a spring clip, best shown in FIGS. 14 and 15. It has a flat top 240, and a reversely bent bottom hook 242. The top is covered with a pressure-sensitive adhesive film or tape 244 which is adhesive on both sides, and the prism is held by its adhesive surface. The clip is held frictionally on the platform 224, and the prism is adjustable sidewardly by moving the spring clip. It is adjustable vertically by releasing the set screw 220 and raising or lowering the stem 218. It may be given a wobble or tip-tilt adjustment by means of the two thumb screws 228.

In the particular constructor system here illustrated the rails are round rods which are three-quarter inch in diameter, and made of solid stainless steel. They are supplied in different lengths from 10 to 100 centimeters long, and are five inches apart center to center. The threaded tubes are three inches in outside diameter, and two and three-quarter inches in inside diameter, and are provided in different lengths from 15 to 150 millimeters. They are made of aluminum, coated black inside and outside. They have a male thread at one end and a female thread at the other. The light shields are thin tubing without threads, and dimensioned to be slidable on the threaded tubes. The element holder will accept an element ranging in diameter from 10 to 70 millimeters. The right angle fixture will accept a prism up to about 65 millimeters in each direction.

It is believed that the construction and method of use of my optical constructor system, as well as the advantages thereof, will be apparent from the foregoing detailed description. The base and support ring may be used to hold spaced rails in either superposed or side by side relation. The optical system may be open, or partly closed, or fully closed. The support ring may be used to hold tubes and/or rails, and vice versa. If of full diameter the tubes may be clamped, and if of smaller diameter they may be centered by means of radial screws, additional slidable tubes may be used as light shields. A right angle turn for beam splitting is easily arranged. The assembled system is rigid and may be a permanent instead of temporary apparatus. Universal adjustments, including tip-tilt adjustments, are available.

It will be understood that while I have shown and described the invention in a preferred form, changes may be made without departing from the scope of the invention as sought to be defined in the following claims. In the claims the reference to a part, for example the right angle fixture, being upright, is for convenience of description and is relative, for it can be used horizontally for a vertical beam bend, instead of being used vertically for a horizontal beam bend. The reference to the post being "hexagonal" is not intended to exclude other equivalent flats which differ in number.

I claim:

1. An optical constructor system including a carriage supported between and adjustable along first and second spaced rails, said carriage comprising a ring having an enclosed seat on one side receiving said first rail and having an openable seat on the opposite side receiving said second rail, said openable seat permitting the carriage to be released from the second rail when said seat is opened, said enclosed seat being rotatable about said first rail and being effective to support said carriage when said carriage is released from said second rail, whereby said carriage is turnable about said first rail when released from said second rail, said ring having a plurality of radially disposed screws at spaced points to provide a mounting for an optical element such as a reticle or lens or the like.

2. An optical constructor system as defined in claim 1 in which the enclosed seat has a set screw and in which the open seat has a tapered lock screw which is spaced from one side of the seat and acts as the opposite side of the seat, with the rail therebetween.

3. An optical constructor system as defined in claim 1 in which said ring has a spring pressed support at one point, and two radially disposed screws at spaced points to provide a three point mounting substantially at the periphery of the optical element.

4. An optical constructor system as defined in claim 1, in which two radial screws are eccentrically mounted in rotatable plugs, which in turn are rotatable in the ring, and have releasable means to lock the plugs against rotation.

5. An optical constructor system as defined in caim 1, in which two radial screws are eccentrically mounted in rotatable plugs, which in turn are rotatable in the ring, and in which the plugs are tapered and are reecived in mating tapered holes in the ring, and in which a clamp spring bears against a plug and has a releasable clamp screw to tighten the spring against the plug.

6. An optical constructor system as defined in claim 3, in which two radial screws are eccentrically mounted in rotatable plugs, which in turn are rotatable in the ring, and in which the plugs are tapered and are received in mating tapered holes in the ring, and in which a clamp spring bears against a plug and has a releasable clamp screw to tighten the spring against the plug.

7. An optical constructor system as defined in claim 1, in which the carriage receives an annular holder for the optical element, and in which the holder comprises three support arms and two rings, with the outer ends of the three support arms secured between the two rings, the inner ends of said support arms having means to reecive and clamping the peripheral edge of the aforesaid optical element.

8. An optical constructor system as defined in claim 3, in which the carriage receives an annular holder for the optical element, and in which the holder comprises three support arms and two rings, with the outer ends of the three support arms secured between the two rings, the inner ends of said support arms having means to receive and clamping the peripheral edge of the aforesaid optical element.

9. An optical constructor system as defined in claim 5, in which the carriage receives an annular holder for the optical element, and in which the holder comprises three support arms and two rings, with the outer ends of the three support arms secured between the two rings, the inner ends of said support arms having means to receive and clamping the peripheral edge of the aforesaid optical element.

10. An optical constructor system as defined in claim 1, in which there is a support ring for supporting the aforesaid rails, a post, a base, and levelling screws for the base, said post being hexagonal with reduced threaded ends, the lower threaded end being received in the base, the upper threaded end receiving said support ring, said support ring being split at one side between the rails and having a clamp screw for receiving and holding a tube.

11. An optical constructor system as defined in claim 1, in which there is a support ring for supporting the aforesaid rails, a post, a base, and levelling screws for the base, said post being hexagonal with reduced threaded ends, the lower threaded end being received in the base, the upper threaded end receiving said support ring, said support ring having a threaded boss at right angles to the post to receive the upper end of the post when the rails are in sideward instead of superposed relation, said support ring being split at the side opposite the boss and having a clamp screw for receiving and holding a tube.

12. An optical constructor system as defined in claim 1 including a right angle fixture, said right angle fixture being a hollow generally square box with four large openings in quadrature, the top of said box having four horizontal V grooves in quadrature with clamp caps thereover for top rails, the bottom of said housing having four similar horizontal V grooves in quadrature with clamp caps for bottom rails, and having an upright bushing for receiving an upright stem for carrying an optical element inside the box.

13. An optical constructor system as defined in claim 6 including a right angle fixture, said right angle fixture being a hollow generally square box with four large openings in quadrature, the top of said box having four horizontal V grooves in quadrature with clamp caps thereover for top rails, the bottom of said housing having four similar horizontal V grooves in quadrature with clamp caps for bottom rails, and having an upright bushing for receiving an upright stem for carrying an optical element inside the box.

14. An optical constructor system as defined in claim 12, in which the upright stem is vertically adjustable and carries a horizontal table, and in which the horizontal table carries a horizontal platform thereover resting on a stud and two thumb screws carried by the table to provide a three point support for the platform, a leaf spring beneath the platform holding said platform downward against the three point support, the upper end of one thumb screw being received in a conical seat, the upper end of the other thumb screw being received in a channel, said platform being adapted to receive the optical element.

References Cited

UNITED STATES PATENTS

| | | | |
|---|---|---|---|
| 565,346 | 8/1896 | Goodyear | 88—58 |
| 2,478,609 | 8/1949 | Townsley | 88—14 X |
| 2,675,738 | 4/1954 | Ellis et al. | 88—56 |
| 3,216,678 | 11/1965 | Foedisch | 248—1 |
| 3,334,959 | 8/1967 | Walsh | 350—252 |

DAVID SCHONBERG, Primary Examiner

M. J. TOKAR, Assistant Examiner

U.S. Cl. X.R.

356—153